Nov. 29, 1955 G. J. ZWIESLER 2,724,941
LAWN MOWER WITH OSCILLATING CUTTERS
Filed Dec. 26, 1951 3 Sheets-Sheet 1
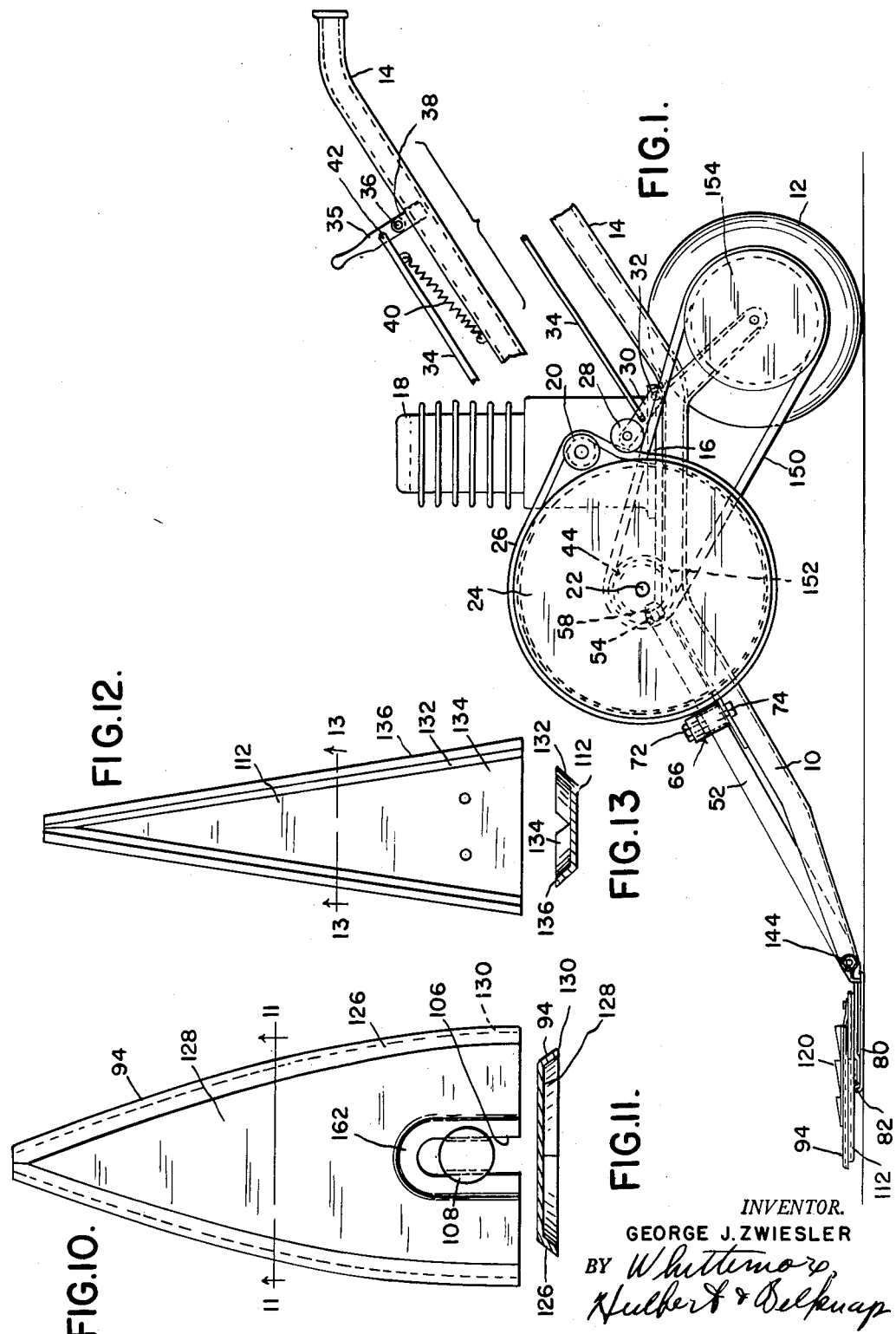
INVENTOR.
GEORGE J. ZWIESLER
BY Whittemore,
Hulbert & Belknap
ATTORNEYS

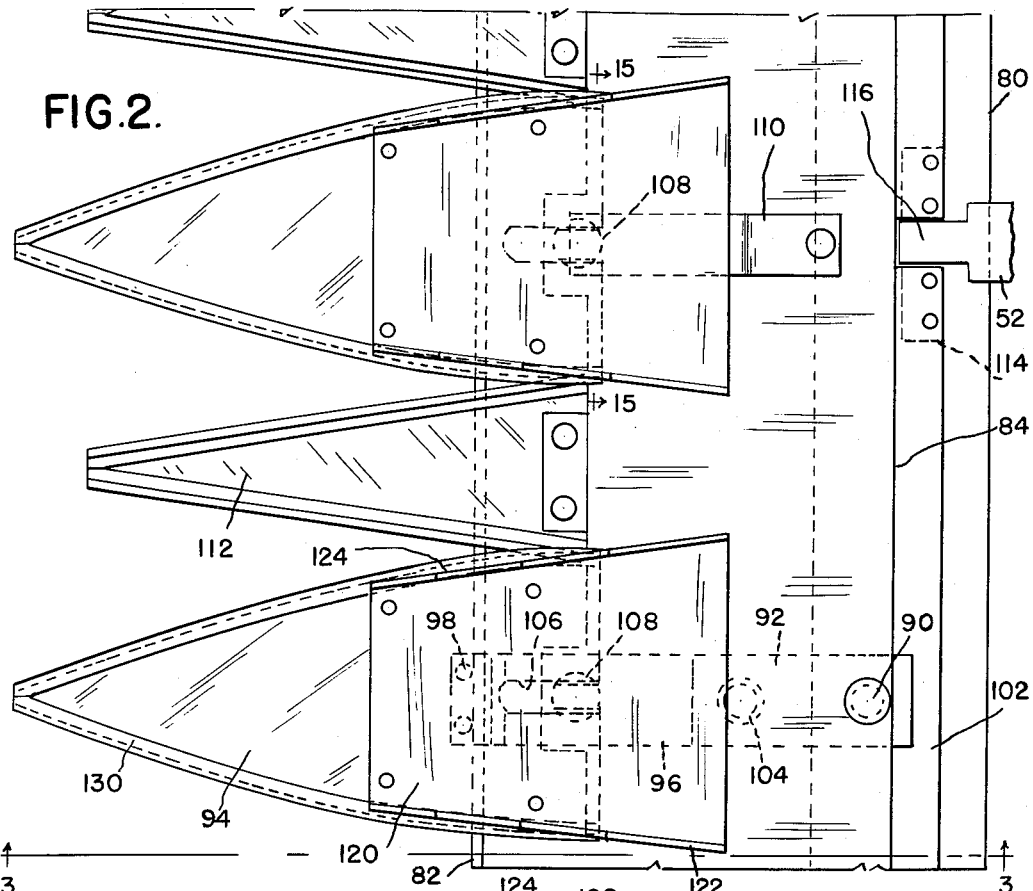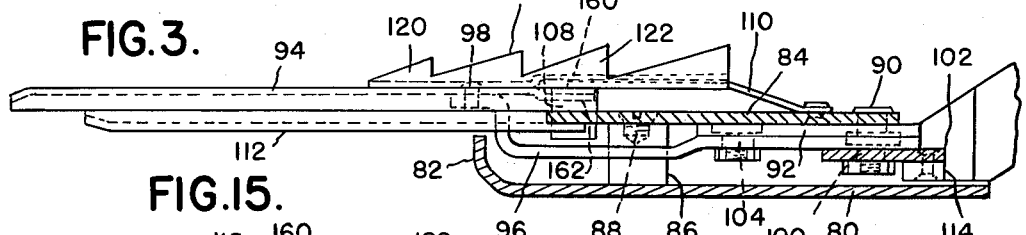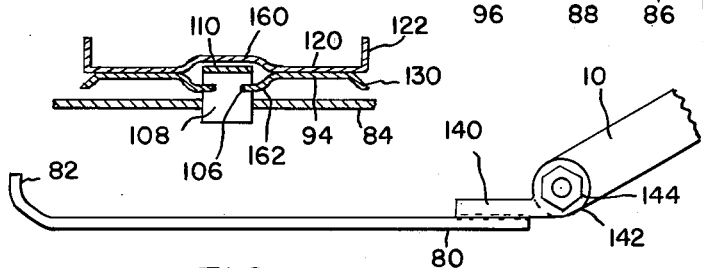

Nov. 29, 1955     G. J. ZWIESLER     2,724,941
LAWN MOWER WITH OSCILLATING CUTTERS
Filed Dec. 26, 1951     3 Sheets-Sheet 3
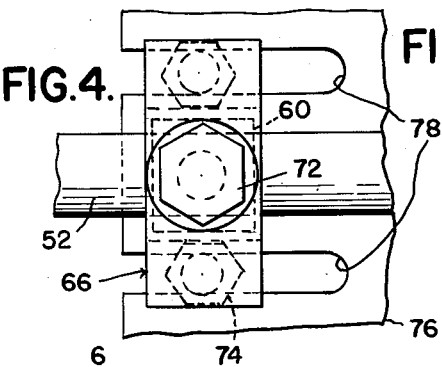
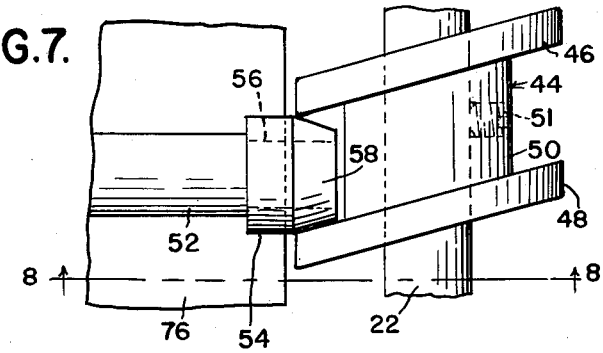
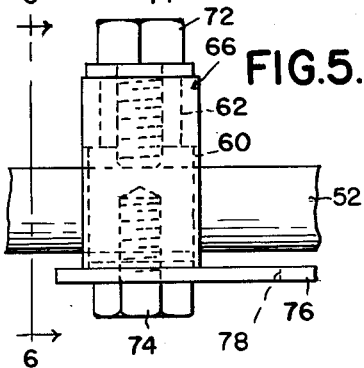
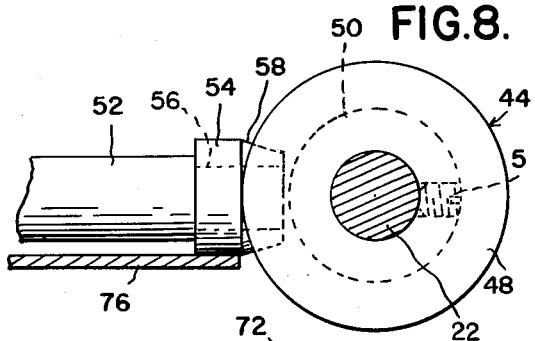
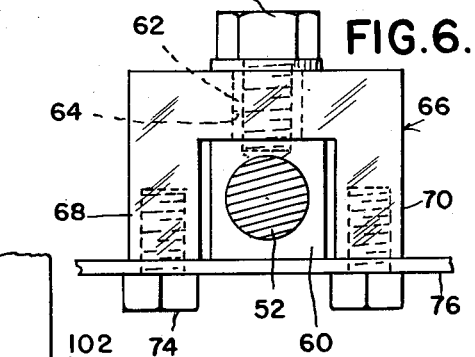
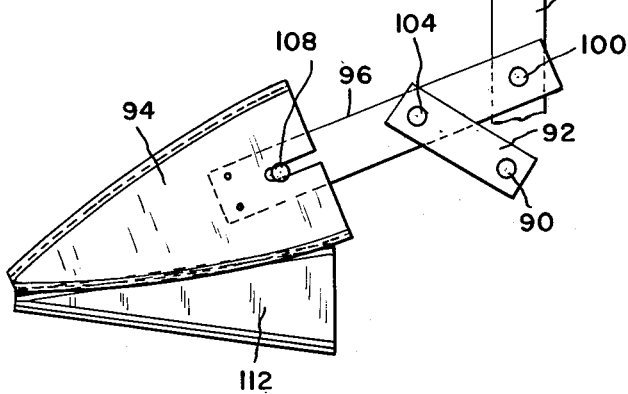
INVENTOR.
GEORGE J. ZWIESLER
BY *Whittemore,*
*Hulbert & Belknap*
ATTORNEYS

United States Patent Office 2,724,941
Patented Nov. 29, 1955

2,724,941

LAWN MOWER WITH OSCILLATING CUTTERS

George J. Zwiesler, Davisburg, Mich.

Application December 26, 1951, Serial No. 263,259

4 Claims. (Cl. 56—26.5)

The present invention relates to cutting mechanism designed particularly for a grass cutter but which is of course capable of other uses, such for example as trimming hedges, or in fact in any operation in which efficient trimming and cutting is desirable.

The present application is a continuation-in-part of my prior copending application Serial No. 730,460, filed February 24, 1947, now Patent No. 2,598,873 and represents in general an improved construction of my invention.

It is an object of the present invention to provide cutting mechanism characterized by the provision of novel and improved driving mechanism, by the use of a special type hollow relatively movable cutting blades, by the housing and protection of the driving mechanism to prevent the same becoming clogged with grass, by improved linkage which lends itself to a more efficient cutting operation, and by its feature of adjustability of the cutting mechanism to provide for cutting grass or the like at variable heights.

Other objects and features of the invention will become apparent as the description proceeds, especially when taken in conjunction with the accompanying drawings, wherein:

Figure 1 is a side elevation of my improved cutting mechanism.

Figure 2 is a fragmentary enlarged vertical plan view of a portion of the cutting mechanism.

Figure 3 is a section on the line 3—3, Figure 2.

Figure 4 is an enlarged fragmentary plan view showing the pivot mounting of the actuating lever.

Figure 5 is a fragmentary side elevation of the structure shown in Figure 4.

Figure 6 is a fragmentary enlarged section on the line 6—6, Figure 5.

Figure 7 is a fragmentary enlarged plan view of the connection between the actuating lever and the drive means therefor.

Figure 8 is a fragmentary section on the line 8—8, Figure 7.

Figure 9 is a diagrammatic view illustrating the relationship between fixed and movable blades in one limiting position.

Figure 10 is a plan view of a movable cutting blade employed in the present apparatus.

Figure 11 is a section on the line 11—11, Figure 10.

Figure 12 is a plan view of a stationary cutting blade.

Figure 13 is a section on the line 13—13, Figure 12.

Figure 14 is a fragmentary view illustrating the adjustable support for the cutting mechanism.

Figure 15 is a fragmentary section on the line 15—15, Figure 2.

Referring now to the drawings, the cutting mechanism comprises a frame composed generally of a pair of tubular members 10 to the rear end of which is journaled a supporting wheel 12. The tubular handle means 14 extends upwardly and rearwardly from the frame. Intermediate the ends of the frame bars 10 is a supporting plate 16 on which is mounted an internal combustion engine 18 including a driving sheave 20. Mounted on the plate 16 adjacent the forward end thereof are suitable bushings supporting a rotary shaft 22 on which is mounted a relatively large sheave 24, the sheaves 20 and 24 being interconnected by a flexible drive belt 26 which may conveniently take the form of a conventional V-belt. In order to establish and control driving action between the motor sheave or pulley 20 and the enlarged sheave 24, there is provided an idler pulley 28 mounted on an arm 30 which in turn is pivoted as indicated at 32 to the supporting plate 16. A link 34 is connected at one end to the arm 30 and at the other end to a control lever 35, the latter being pivoted as indicated at 36 to a projection 38 carried by the handle structure 14. Preferably, a tension spring, as indicated at 40, interconnects the handle 14 and the link 34 in a direction tending to rock the arm 30 in a counterclockwise direction to take up slack in the V-belt 26 and to thereby establish driving connection between sheaves 20 and 24. As is apparent from Figure 1, link 34 is connected to lever 35 in such a manner that when lever 35 is pulled rearwardly, or clockwise as seen in Figure 1 to a limiting position, the pivot connection 42 between the link 34 and the lever 35 moves into an over-center relation with respect to the pivot 36, thereby latching idler pulley 28 in position which releases the tension in the V-belt 26, thereby interrupting rotation of the sheave 24.

Drive shaft 22 includes drive mechanism 44 best seen in Figures 7 and 8. This drive mechanism comprises a pair of inclined discs 46 and 48 formed integrally on a sleeve 50 adapted to be secured to the shaft 22 by means of a set screw indicated at 51. Actuating lever 52 is pivoted intermediate its ends as will subsequently be described, and is provided at its rear end with a rotary bushing 54 which is preferably formed of hardened steel and which is retained by riveting or the like on the reduced end 56 of the lever 52 for rotation thereon. The bushing 54 as illustrated, includes the conical end portion 58, the cone angle of which is selected such that in one limiting position an element of the cone becomes tangent to the adjacent element at the inner surface of the adjacent discs 46 or 48.

The lever 52, as best seen in Figures 4, 5 and 6, extends through a pivot block 60 having a reduced cylindrical neck 62 extending through an opening 64 in a yoke 66. The block 60 is thereby mounted for swiveling movement between the legs 68 and 70 of the yoke. The neck 66 has a tapped opening therethrough which receives a screw 72 and the screw is adapted to retain the block rotatably mounted in the yoke and also to serve as a set screw to engage the portion of the lever 52 passing through the opening in the block 60. The yoke 66 is attached by screws indicated generally at 74 to a plate 76 extending between frame bars 10. The forward edge of the plate 76 includes elongated slots 78 through which the supporting screws 74 extend, thereby permitting adjustment of the pivot assembly longitudinally of the lever 52 to vary the throw of its forward end.

Referring now to Figures 2 and 3, the cutting mechanism comprises a supporting shoe 80, the forward end of which is upturned as indicated at 82. The shoe 80 extends transversely for the width of the cutting mechanism and constitutes a ground engaging element. Located above the shoe 80 is a support plate 84, the support plate 84 being carried by the shoe 80 and secured thereto by a plurality of upstanding posts 86 which as illustrated, are welded to the upper portion of the shoe and to which the support plate 84 is attached by screws 88. Pivoted to the underside of the support plate 84 by a plurality of stationary pivot pins 90 are a plurality of short links 92, each of which is adapted to be associated with a single movable cutting blade 94. Each of the movable cutting blades 94 has rigidly secured thereto a rearwardly extending blade holder and pivot bar or arm 96 which as indicated in Figure 3, is riveted or otherwise secured to the movable blade 94 at 98. At its rear end the bar 96 is provided with an opening for the reception of a pivot pin 100 by means of which the rear ends of the bars 96 are pivoted to a transversely extending tie bar 102. Intermediate the ends of the bars 96 they are connected by pivot pins 104 to the forward end of the short links 92.

The movable blades 94 are each provided with open ended slots 106 extending forwardly from their rear edges and the edges of these slots are slidably mounted in slots formed in the sides of pivot pins 108 which extend through openings provided adjacent the forward edge of the support plate 84. Secured to the upper surface of the support plate 84 are a plurality of leaf springs 110 each of which has its forward end portion resting upon the upper surface of each movable blade assembly, thereby urging the associated upper movable blade 94 downwardly into contact with the adjacent stationary blades 112. Stationary blades 112 are riveted or otherwise rigidly secured to extend forwardly from the support blade 84 and movable and stationary cutting blades alternate across the apparatus.

The tie bar 102 intermediate its ends has riveted or otherwise secured thereto a pair of blocks 114 which are spaced apart and constitute wear plates. The forward end of the actuating lever 52 is reduced, as indicated at 116, and extends between the blocks 114 and into a corresponding slot formed at the rear edge of the tie bar 102. The reduced portion 116 of the lever 52 has some lost motion with respect to the sides of the blocks 114 to permit limited angular movement therein.

As a result of the foregoing construction, rotation of the drive shaft 22 results in back and forth oscillation of the lever 52 about an axis determined by the neck 62 of the block 60. The forward end of the lever 52, therefore imparts a generally longitudinal motion to the tie bar 102. The precise motion of the tie bar 102 is determined by the links and levers previously described. In detail, the tie bar 102 is connected to the bars 96 by the pivot pins 100 and accordingly, the back and forth motion of the tie bar is transmitted to the bars 96, and hence to the movable blades 94. The blades themselves are permitted to oscillate about the axis of the pins 108, and in addition to partake of a front to rear sliding motion relative to the pins 108 as a result of the elongated slots 106. However, the bars 96 are connected to the short links 92 by the pins 104. It will be recalled that the short links 92 oscillate about the axis of the fixed pins 90, and accordingly, the motion of the pins 104 is constrained to circular arcs concentric with the pins 90. As a result of the foregoing, back and forth oscillation of the tie bar 102 results in a combination rocking motion and front to rear sliding motion of the movable blades 94. Moreover, the particular linkage described provides a maximum of front to rear sliding when the movable blades 94 reach the limiting position illustrated in Figure 9, thus providing a most efficient cutting action as a result of several considerations. In the first place, at such time the leverage or camming action existing between the plates 46 and 48 and the bushing 54 is at a maximum. At the same time due to the displacement of the cutting zone from the axis of the pin 108, leverage at this time is at a minimum. However, shearing action as a result of sliding motion is at a maximum, thus tending to overcome the reduction of leverage.

It will be observed that the actuating links and levers are for the most part housed between the ground engaging shoe 80 and the support plate 84, thus preventing grass and foreign material from clogging the moving parts. In order to facilitate the rearward movement of grass which has been cut by the coaction between the fixed and movable blades, each of the movable blades 94 is provided with a grass removing plate indicated generally at 120. The grass removing plate 120 has at its opposite sides upstanding flanges 122 each of which is formed to provide rearwardly sloping teeth 124. Due to the rapid back and forth rocking and front to rear sliding movement of the movable blades 94, the grass removing plate quickly engages and throws cut grass to the rear of the mowing apparatus. This in conjunction with the housing of the moving parts completely avoids the danger of clogging of the actuating mechanism.

Referring now to Figure 10 there is illustrated a detail of a movable blade 94. The slot 106 is illustrated in this figure, and as best seen in Figure 11, it will be observed that the blade is provided with obliquely extending flanges 126, thus leaving a central portion hollow, as indicated at 128, and providing relatively narrow flat surfaces 130 which are adapted to cooperate with similar surfaces on the stationary blades.

Referring now to Figures 12 and 13 there is illustrated in detail one of the stationary blades 112, and by referring to Figure 13 it will be observed that the blades 112 have obliquely inclined flanges 132, thus leaving the central portion of the stationary blades hollow as indicated at 134, and leaving relatively narrow surfaces 136 to be engaged by the relatively narrow surfaces 130 of the movable blades 94. Thus, the surface-to-surface contact between the movable blades 94 and the stationary blades 112 is limited to the instantaneously overlapped portions of the surfaces 130 and 136. This in turn provides for a most efficient shearing action and permits relatively light leaf springs 110 to maintain the blades in perfect shearing contact. In Figure 10, the pin 108 is shown in position in the slot 106.

Referring now to Figure 14 there is illustrated the manner of mounting the cutting mechanism on the frame. In this figure the ground engaging shoe 80 is illustrated as having provided adjacent its rear edge a pair of blocks 140, which are welded or otherwise secured thereto. The blocks 140 have rearwardly extending apertured ears 142 and the forward ends of the tubular frame elements 10 are preferably flattened and apertured to receive assembly elements such as the nut and bolt construction illustrated at 144. Obviously, the angularity of the ground engaging shoe 80 with respect to the frame members 10 may be adjusted as required, thereby determining the height at which the grass or similar material is to be cut.

Preferably, means are provided for driving the cutting mechanism and as seen in Figure 1, this means may take the form of a belt 150 driven by a pulley 152 carried by the shaft 22 driving a pulley 154 connected to the shaft supporting the wheel 12.

Referring now to Figure 15 the preferred construction and arrangement of the spring 110 is shown in detail. As seen in this figure, it will be observed that the grass removing plate 120 has an upwardly formed portion 160 located generally centrally between its lateral edges and extending forwardly from its rear edge. At the same time the movable blade 94 adjacent its rear end has a downwardly depressed portion 162 extending along the sides of the slot 106. The upper end of the pin 108 extends into the space thus provided between the upwardly formed portion 160 of the grass removing plate 120 and the downwardly formed portion 162 of the movable blade 94. The forward end of the spring 110 extends into this space and directly engages the top of the pin 108 thereby urging the entire assembly of the movable blade 94, plate 120, and pin 108 downwardly to a position determined by engagement between the flat edge portions 130 of the movable blade and the corresponding portions of the fixed or stationary blades 112.

The drawings and the foregoing specification constitute a description of the improved cutting mechanism in such full, clear, concise and exact terms as to enable any person skilled in the art to practice the invention, the scope of which is indicated by the appended claims.

What I claim as my invention is:

1. Cutting mechanism comprising a transversely extending support member, a plurality of forwardly extending fixed blades secured to said member, a plurality of forwardly extending movable blades alternated with said fixed blades, pivot pins on said member, each of said movable blades having a longitudinally extending slot adjacent its rear end in which one of said pins is received, an arm extending rearwardly from each of said movable blades, a tie-bar pivotally connected to the rear ends of said arms, a plurality of short links pivotally connected at their rear ends to said member and connected at their forward ends to intermediate portions of said arms.

2. A mower comprising a transverse support plate having a series of openings spaced along said plate adjacent its front edge, a series of fixed blades carried by said plate intermediate said openings and projecting forwardly therefrom, a series of movable blades alternated with said fixed blades, said movable blades having slots extending forwardly from the rear edge thereof, a pin in each of said slots, said pins having opposed transverse slots receiving opposite edge portions of the slots in said movable blades, said pins projecting beyond said blades and having portions received in the openings in said plate, spring means on said plate engaging the ends of said pins to press said movable blades against said fixed blades, and drive means for rocking said movable blades about the axes of said pins and simultaneously moving said blades forwardly and rearwardly relative to said pins.

3. A mower as defined in claim 2 in which said drive means comprises arms secured to the under-sides of said movable blades and extending rearwardly beneath said plate, a tie-bar connected to the rear ends of said arms, at least two short links each pivoted at its rear end to said plate and at its front end to an intermediate portion of one of said arms.

4. A mower comprising a transverse support plate having a series of openings spaced along said plate adjacent its front edge, a series of fixed blades carried by said plate intermediate said openings and projecting forwardly therefrom, a series of movable blades alternated with said fixed blades, said movable blades having slots extending forwardly from the rear edge thereof, a pin in each of said slots, said pins having opposed transverse slots receiving opposite edge portions of the slots in said movable blades, said pins projecting beyond said blades and having portions received in the openings in said plate, drive means for rocking said movable blades about the axes of said pins and simultaneously moving said blades forwardly and rearwardly relatively to said pins, and leaf springs carried by said plate having portions engaging said pins so as to press said pins and movable blades downwardly to retain the pins assembled with the plate and to maintain the movable blades in shearing contact with said fixed blades.

References Cited in the file of this patent

UNITED STATES PATENTS

| | | |
|---|---|---|
| 142,417 | Shoales | Sept. 2, 1873 |
| 548,878 | Jarboe | Oct. 29, 1895 |
| 807,897 | Auble | Dec. 19, 1905 |
| 925,352 | Kryger | June 15, 1909 |
| 1,604,726 | Stauter | Oct. 26, 1926 |
| 2,448,078 | Brown | Aug. 31, 1948 |